(12) United States Patent
Deng et al.

(10) Patent No.: US 11,648,906 B2
(45) Date of Patent: May 16, 2023

(54) AIRBAG ASSEMBLY

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/173,351

(22) Filed: Feb. 11, 2021

(65) Prior Publication Data

US 2022/0250571 A1  Aug. 11, 2022

(51) Int. Cl.
*B60R 21/21* (2011.01)
*B60R 21/264* (2006.01)
*B60R 21/015* (2006.01)

(52) U.S. Cl.
CPC ........ *B60R 21/21* (2013.01); *B60R 21/01554* (2014.10); *B60R 21/264* (2013.01)

(58) Field of Classification Search
CPC ..................................................... B60R 21/21
See application file for complete search history.

(56) References Cited

U.S. PATENT DOCUMENTS

| | | | |
|---|---|---|---|
| 6,854,782 B2 | 2/2005 | Reichert et al. | |
| 9,981,622 B2* | 5/2018 | Ohmura | G01C 21/34 |
| 10,081,323 B2* | 9/2018 | Nagasawa | B60R 21/013 |
| 10,821,928 B2 | 11/2020 | Deng et al. | |
| 10,821,930 B2 | 11/2020 | Malapati et al. | |
| 11,052,853 B2* | 7/2021 | Choi | B60R 21/231 |
| 11,084,444 B2* | 8/2021 | Richert | B60R 21/20 |
| 11,142,157 B2* | 10/2021 | Kim | B60R 21/231 |
| 2016/0272141 A1* | 9/2016 | Ohmura | B60R 21/01554 |
| 2019/0084517 A1* | 3/2019 | Iyer | B60N 2/143 |
| 2020/0070763 A1* | 3/2020 | Hill | B60R 21/214 |
| 2020/0290549 A1* | 9/2020 | Buice | B60R 21/217 |
| 2021/0107426 A1* | 4/2021 | Choi | B60R 21/20 |

FOREIGN PATENT DOCUMENTS

| | | | |
|---|---|---|---|
| JP | 2018127057 A | * | 8/2018 |
| JP | 6747327 B2 | | 8/2020 |
| KR | 1019970076893 B1 | | 2/2000 |

* cited by examiner

*Primary Examiner* — Nicole T Verley
(74) *Attorney, Agent, or Firm* — Frank A. MacKenzie; Bejin Bieneman PLC (57) ABSTRACT

A vehicle includes a seat movable to a forward-facing position and a rearward-facing position. The vehicle includes a track elongated along a vehicle-longitudinal axis. The vehicle includes an airbag assembly movable along the track. The vehicle includes a computer having a processor and a memory storing instructions executable by the processor to move the airbag assembly along the track to a first position in response to identifying the seat is in the forward-facing position and to a second position in response to identifying the seat is in the rearward-facing position, the first position different than the second position relative to the seat.

17 Claims, 7 Drawing Sheets

AIRBAG ASSEMBLY

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

A vehicle includes a seat movable to a forward-facing position and a rearward-facing position. The vehicle includes a track elongated along a vehicle-longitudinal axis. The vehicle includes an airbag assembly movable along the track. The vehicle includes a computer having a processor and a memory storing instructions executable by the processor to move the airbag assembly along the track to a first position in response to identifying the seat is in the forward-facing position and to a second position in response to identifying the seat is in the rearward-facing position, the first position different than the second position relative to the seat.

The seat may include a seatback, the first position may be a first distance from the seatback along the vehicle-longitudinal axis, the second position may be a second distance from the seatback along the along the vehicle-longitudinal axis, and the first distance less than the second distance.

The seat may include a seatback, the first position may be at the seatback along the vehicle-longitudinal axis, and the second position may be spaced from the seatback along the along the vehicle-longitudinal axis.

The vehicle may include an actuator that moves the airbag assembly along the track in response to a command from the computer.

The airbag assembly may include a housing, an inflator, and an airbag inflatable to an inflated position.

The airbag in the inflated position may extend forward from the housing.

The airbag in the inflated position may be at a common position relative to the seat when the airbag assembly is at the first position and at the second position.

The first position and the second position may be positions of the housing along the track.

The seat may be movable along the vehicle-longitudinal axis.

The instructions may include instructions to select the first position and the second position based on a position of the seat along the vehicle-longitudinal axis.

The vehicle may include a door, the track may be fixed to the door.

The vehicle may include a sensor that detects whether the seat is in the forward-facing position or the rearward-facing position, the sensor may be in communication with the computer.

The instructions may include instructions to identify, based on data from the sensor, whether the seat is in the forward-facing position or the rearward-facing position.

The seat may include a seatback, the track may be at a top third of the seatback.

A computer having a processor and a memory storing instructions executable by the processor to identify whether a seat is in a forward-facing position or a rearward-facing position. The instructions include instructions to move an airbag assembly along a track elongated along a vehicle-longitudinal axis to a first position in response to identifying the seat is in the forward-facing position and to a second position in response to identifying the seat is in the rearward-facing position, the first position different than the second position relative to the seat.

The first position may be a first distance from a seatback of the seat along the vehicle-longitudinal axis, the second position may be a second distance from the seatback along the along the vehicle-longitudinal axis, and the first distance may be less than the second distance.

The first position may be at a seatback of the seat along the vehicle-longitudinal axis, the second position may be spaced from the seatback along the along the vehicle-longitudinal axis.

The instructions may include instructions to command an actuator to move the airbag assembly along the track.

The instructions may include instructions to select the first position and the second position based on a position of the seat along the vehicle-longitudinal axis.

Figure 1:
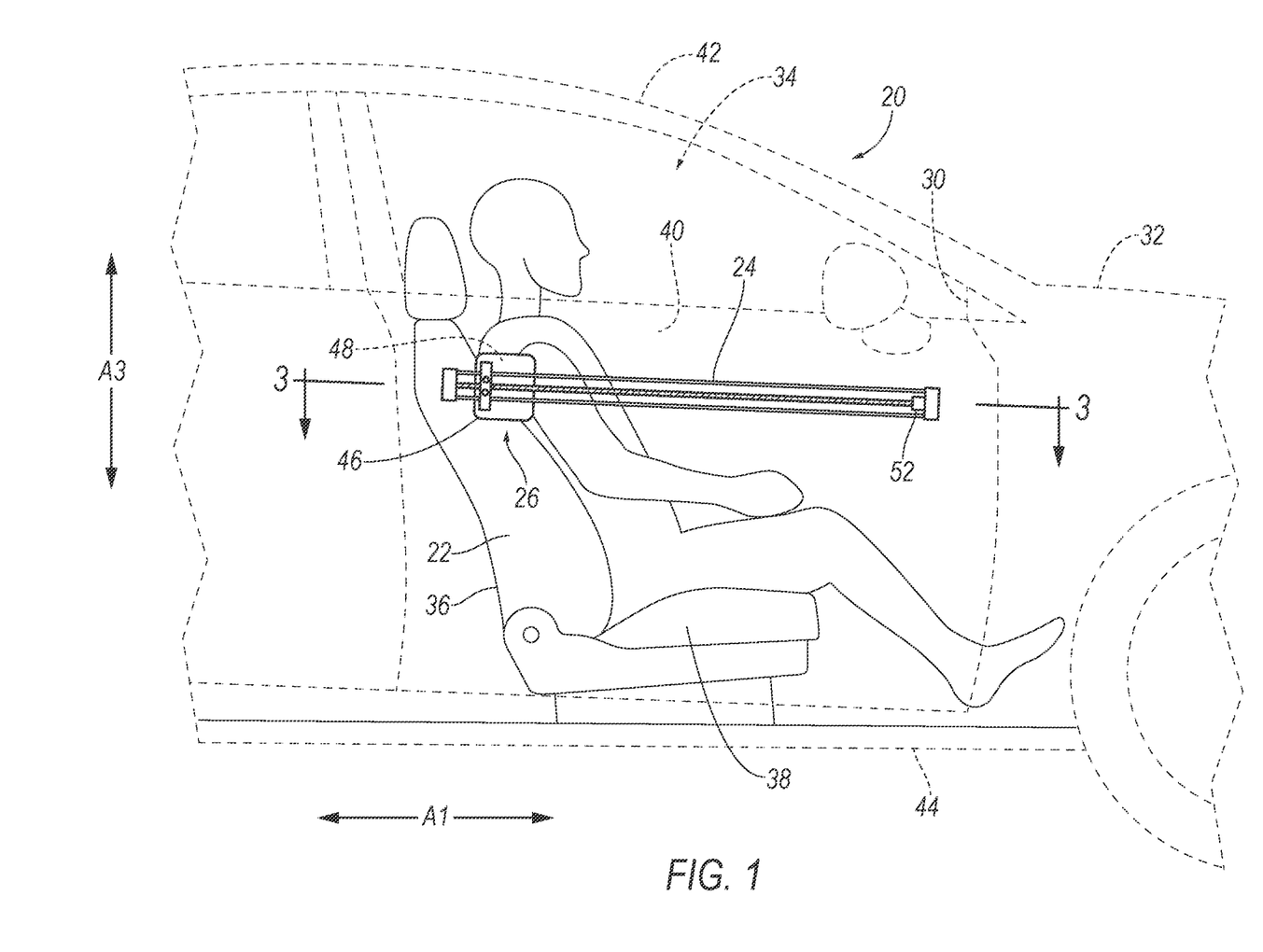
FIG. 1 is a side view of a vehicle having a seat in a forward-facing position and an airbag assembly at a first position along a track.
Figure 2:
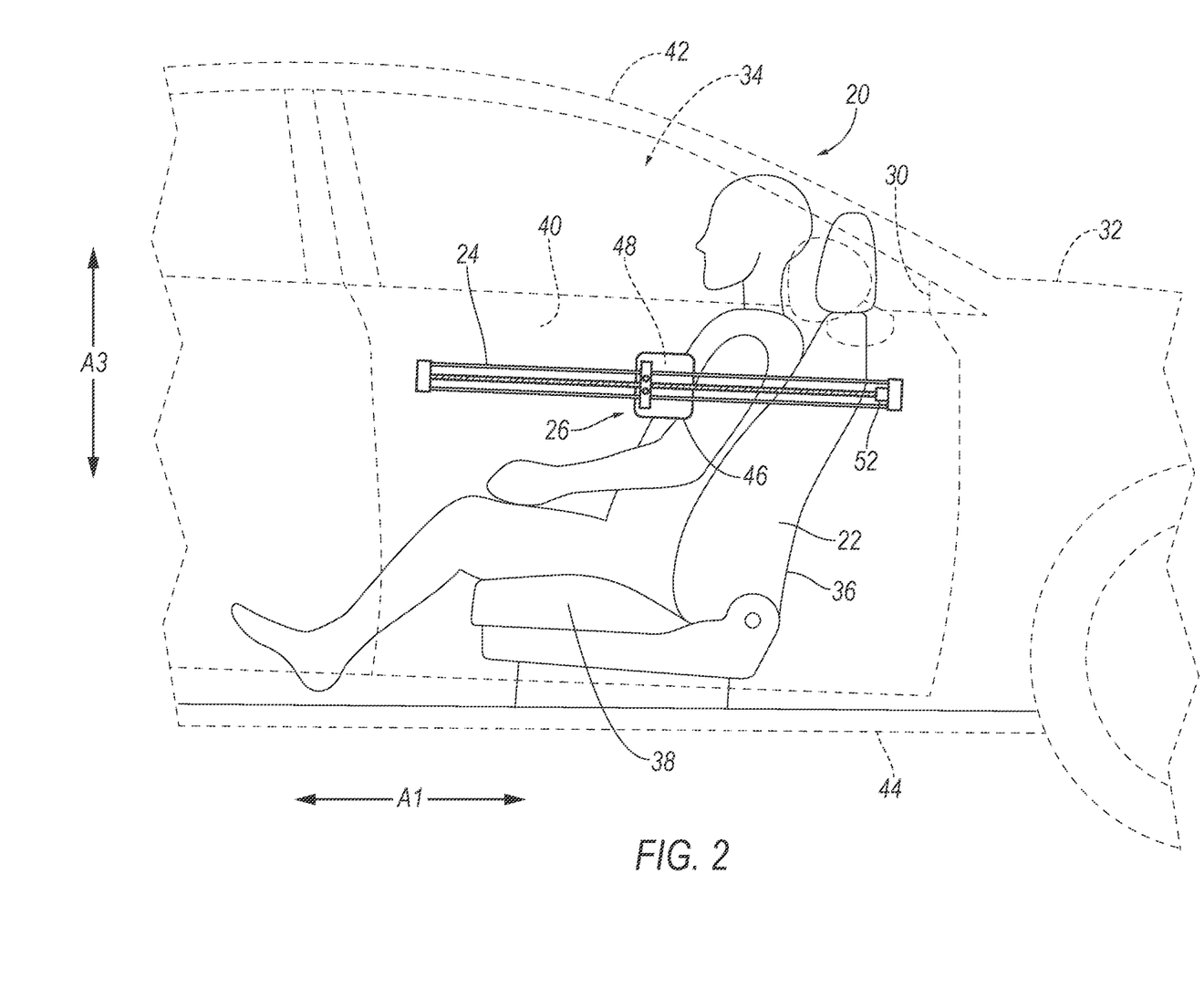
FIG. 2 is a side view of the vehicle having the seat in a rearward-facing position and the airbag assembly at a second position along the track.

With reference to FIGS. 1 and 2, wherein like numerals indicate like elements throughout the several views, a vehicle 20 includes a seat 22 movable to a forward-facing position and a rearward-facing position. The vehicle 20 includes a track 24 elongated along a longitudinal axis A1 of the vehicle 20. The vehicle 20 includes an airbag assembly 26 movable along the track 24. The vehicle 20 includes a computer 28 (illustrated in FIG. 6) having a processor and a memory storing instructions to move the airbag assembly 26 along the track 24 to a first position in response to identifying the seat 22 is in the forward-facing position and to a second position in response to identifying the seat 22 is in the rearward-facing position, the first position different than the second position relative to the seat 22. Positioning the airbag assembly 26 and the first or the second position with the first position different than the second position relative to the seat 22 provides control of kinematics of the occupant of the seat 22, e.g., specific to the forward-facing position and the rearward-facing position.

The vehicle 20 may be any suitable type of ground vehicle, e.g., a passenger or commercial automobile such as a sedan, a coupe, a truck, a sport utility, a crossover, a van, a minivan, a taxi, a bus, etc.

The vehicle 20 defines a longitudinal axis A1 extending between a front and a rear of the vehicle 20. The vehicle 20 defines a lateral axis A2 extending between a right side and a left side of the vehicle 20. The vehicle 20 defines a vertical axis A3 extending between a top 42 and a bottom 44 of the vehicle 20. The longitudinal axis A1, the lateral axis A2, and the vertical axis A3 are perpendicular relative to each other.

In the present description, relative vehicular orientations and directions (by way of example, top 42, bottom 44, front, rear, outboard, inboard, inward, outward, lateral, left, right, etc.) is from the perspective of an occupant in the vehicle 20 facing a forward direction, e.g., toward a forward instrument panel 30 and/or forward windshield of the vehicle 20. The forward direction of the vehicle 20 is the direction of movement of the vehicle 20 when the vehicle 20 is engaged in forward drive with wheels of the vehicle 20 straight.

The vehicle 20 may include a vehicle body 32. The vehicle body 32 includes body panels partially defining an exterior of the vehicle 20. The body panels may present a class-A surface, e.g., a finished surface exposed to view by a customer and free of unaesthetic blemishes and defects. The vehicle body 32 may include, e.g., a roof, a floor, pillars, etc.

The vehicle body 32 defines a passenger compartment 34 to house occupants, if any, of the vehicle 20. The passenger compartment 34 may extend across the vehicle 20, i.e., from one side to the other side of the vehicle 20. The passenger compartment 34 includes a front end and a rear end with the front end being in front of the rear end during forward movement of the vehicle 20.

The vehicle 20 includes one or more seats 22. The example shown in FIG. 1 includes one seat 22, and the vehicle 20 may include any suitable number of seats 22. The seat 22 may be arranged in the passenger cabin in any suitable position, i.e., as front seats, rear seats, third-row seats, etc. The seats 22 may be movable relative to the floor to various positions, e.g., movable fore-and-aft along the longitudinal axis A1. The seats 22 may be of any suitable type, e.g., a bucket seat as shown in FIG. 1.

The seat 22 may rotate, e.g., about the vertical axis A3. For example, the seat 22 may rotate between the forward-facing position and the rearward-facing position, and/or positions therebetween. In the forward-facing position, shown in FIGS. 1 and 4, an occupant of the seat 22 faces the forward instrument panel 30. In the rearward-facing position, shown in FIGS. 2 and 5, an occupant of the seat 22 faces away from the forward instrument panel 30. The forward-facing position may be 180° from the rearward-facing position. The seat 22 may rotate completely, i.e., 360°, about the vertical axis A3. The seat 22 assemblies may rotate between fixed positions, e.g., the forward-facing position and the rearward-facing position, or may be rotatable to an infinite number of positions.

The seat 22 includes a seatback 36 and a seat bottom 38. The seatback 36 may be supported by the seat bottom 38 and may be stationary or movable relative to the seat bottom 38. The seatback 36 and the seat bottom 38 may be adjustable in multiple degrees of freedom. Specifically, the seatback 36 and the seat bottom 38 may themselves be adjustable, in other words, adjustable components within the seatback 36 and/or the seat bottom 38, and/or may be adjustable relative to each other.

Figure 3:
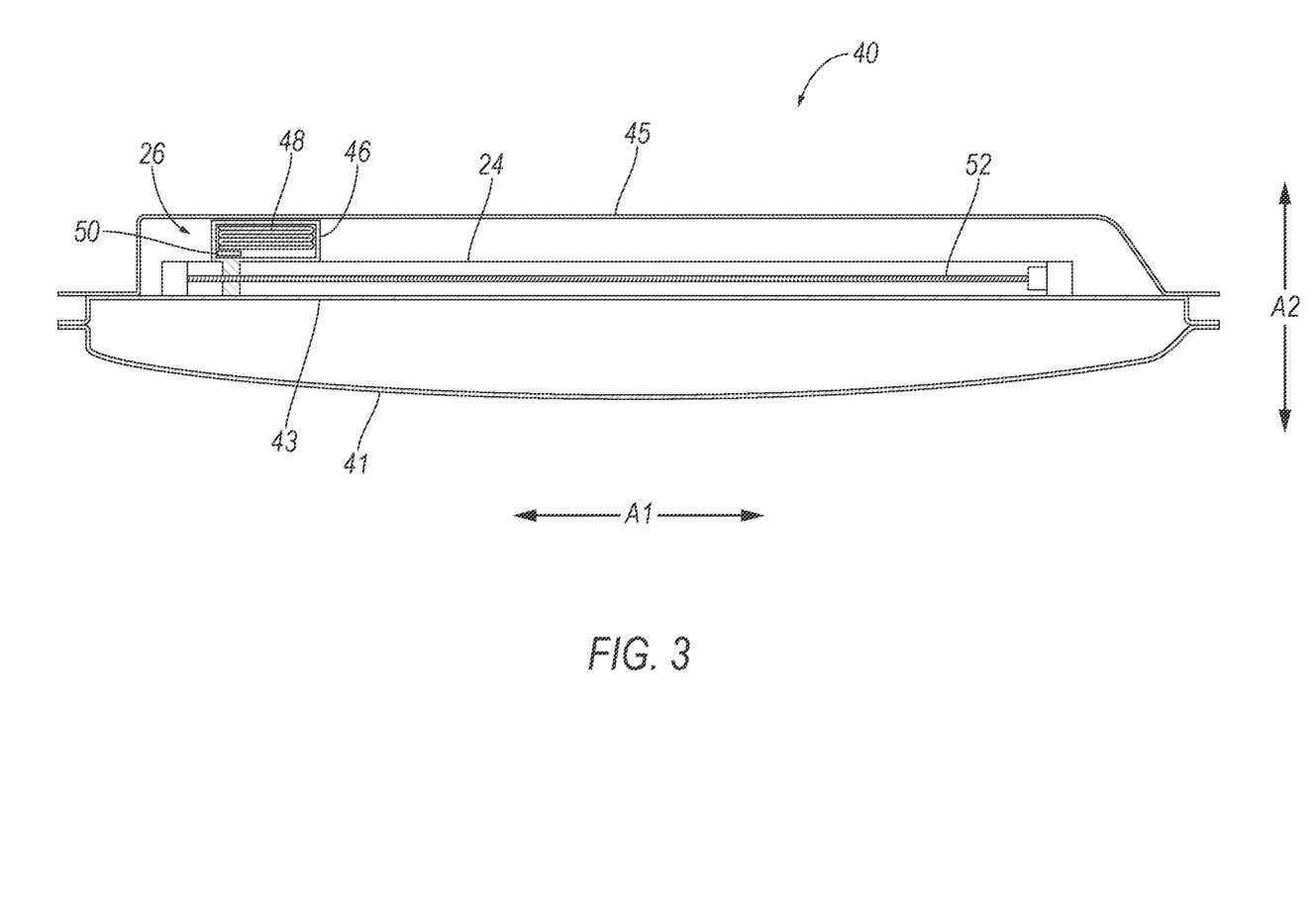
FIG. 3 is a cross-section of a door supporting the track and the airbag assembly.

The vehicle 20 includes a door 40. The door 40 may be moveable to a closed position where ingress and egress of occupants to and from the passenger compartment 34 of the vehicle 20 is inhibited. The door 40 may be moveable to an open position where ingress and egress of occupants to and from the passenger compartment 34 of the vehicle 20 is permitted. The door 40 may be supported by the body, e.g., by one of the pillars and with a hinge. The door 40 may pivot between the open position and the closed position. The door 40 may include, for example and as shown in FIG. 3, an exterior body panel 41, an inner panel 43, a retractable window supported by the inner panel, a covering 45 that has a class-A surface facing the passenger compartment 34, etc. The cover 45 may include a tear seam or the like that can tear or otherwise split.

The track 24 supports and enables movement of the airbag assembly 26 along the longitudinal axis A1. The track 24 is elongated along the longitudinal A1, i.e., the track 24 is longer along the longitudinal axis A1 than along the lateral axis A2 or the vertical axis A3. The track 24 may include rails, channels, grooves, lips, etc., that are elongated along the longitudinal axis A1. The rails, channels, grooves, lips, etc., may permit movement, e.g., of the airbag assembly 26, along the longitudinal axis A1 and inhibit movement along the vertical axis A3. The track 24 may be fixed to the door 40, e.g., to the inner panel via fastener, weld, etc. The track 24 may be at a top third of the seatback 36. For example, the track 24 may be fixed to the door 40 such one third or less of the seatback 36 is between the track 24 and a top of the seatback 36 along the vertical axis A3, and two thirds or more of the seatback 36 is between the track 24 and a bottom 44 of the seatback 36 along the vertical axis A3. As another example, the track 24 may generally be at a should height of an occupant of the seat 22 along the vertical axis A3, e.g., when the seatback 36 is in an upright position.

The airbag assembly 26 includes a housing 46, an airbag 48, and an inflator 50. The airbag 48 in the inflated position controls kinematics of an occupant of the seat 22, e.g., during an impact to the vehicle 20. The airbag housing 46 houses the airbag 48 in the uninflated position and supports the airbag 48 in the inflated position. The airbag 48 may be rolled and/or folded in the uninflated position to fit within the airbag housing 46. The airbag housing 46 may be of any suitable material, e.g., a rigid polymer, a metal, a composite, or a combination of rigid materials. The housing 46 may be supported by the track 24, e.g., movable along the rails, channels, grooves, lips, etc. of the track 24.

Figure 4:
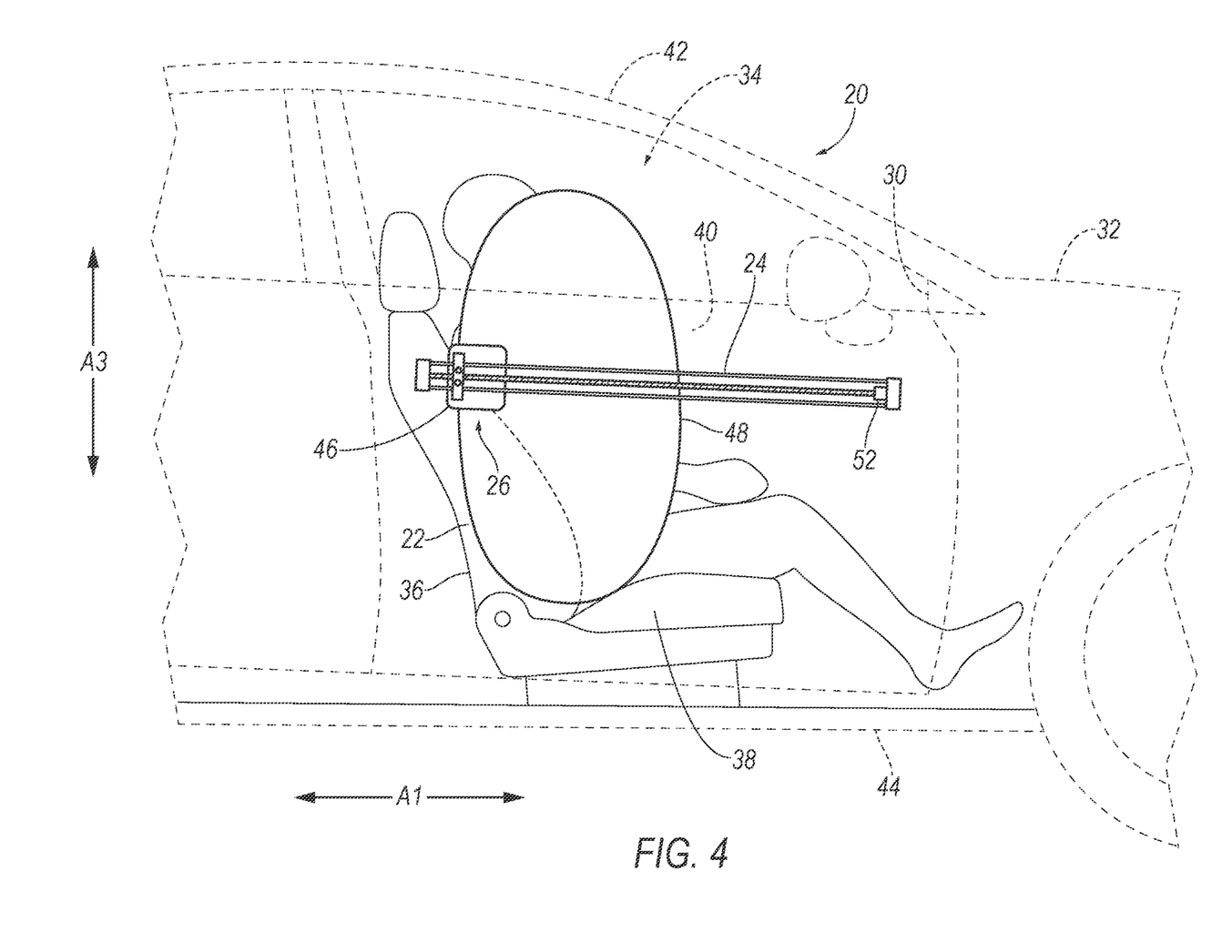
FIG. 4 is a side view of the vehicle having the seat in the forward-facing position and the airbag assembly at the first position with the airbag in an inflated position.
Figure 5:
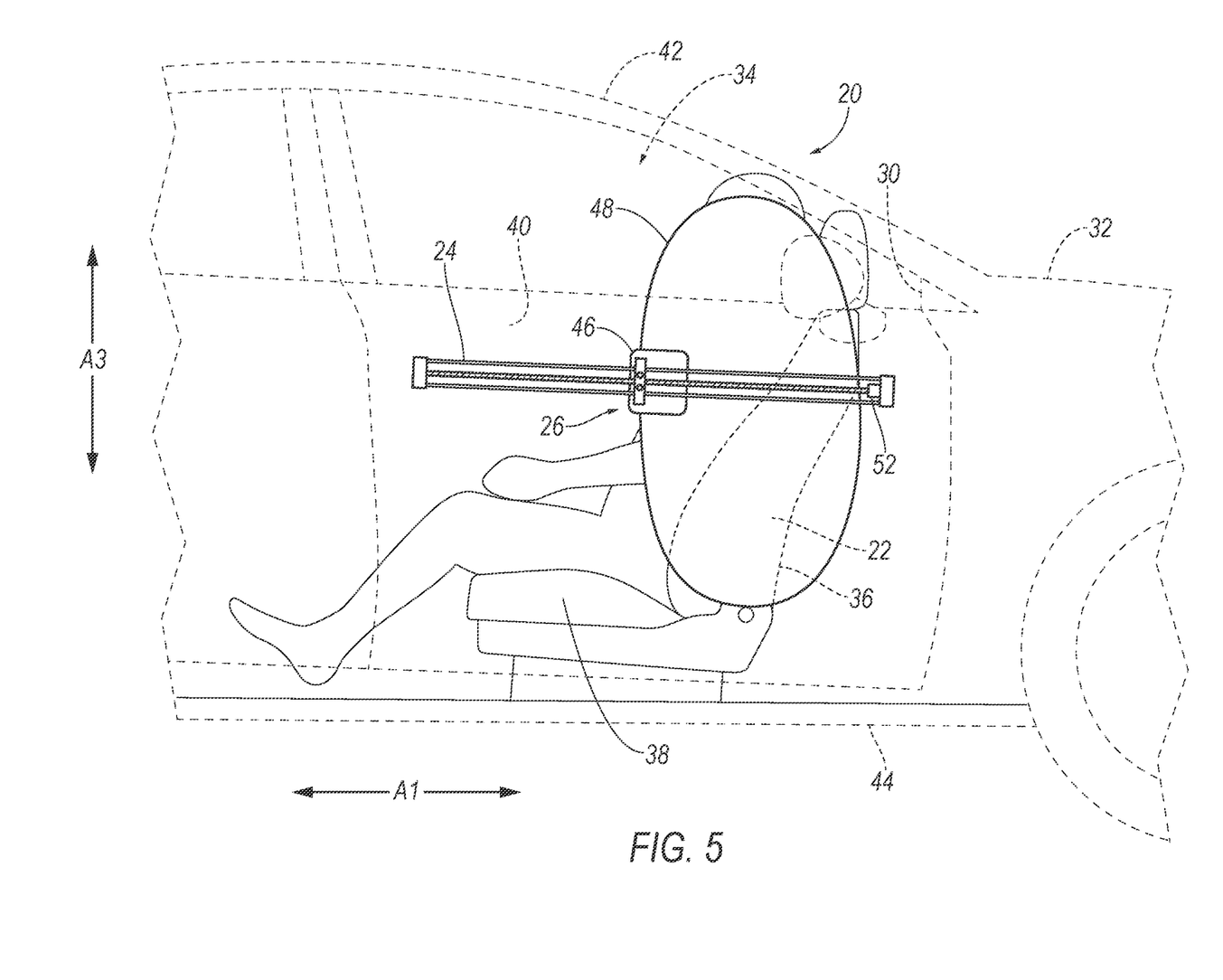
FIG. 5 is a side view of the vehicle having the seat in the rearward-facing position and the airbag assembly at the second position with the airbag in the inflated position.

The airbag 48 is inflatable from an uninflated position, shown in FIGS. 1-3, to an inflated position, shown in FIGS. 4 and 5. For example, the airbag 48 may an inflation chamber that receives inflation medium, e.g., from the inflator 50, to inflate the airbag 48 from the uninflated position to the inflated position. For example, one or more sheets of woven material may be sewn, or otherwise fixed, to enclose the inflation chamber and provide shape to the airbag 48 in the inflated position. The airbag 48 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 48 in the inflated position extends forward from the housing 46, e.g., toward the forward instrument panel 30 along the longitudinal axis A1. The airbag 48 in the inflated position may be asymmetrical relative to the housing 46 and along the longitudinal axis A1. For example, the airbag 48 in the inflated position may extend forward from the housing 46 farther than the airbag 48 in the inflated position extends rearward from the housing 46.

The inflator 50 is in fluid communication with the inflation chamber of the airbag 48. The inflator 50 may be, for example, at least partially in the inflation chamber to deliver inflation medium directly to the inflation chamber or may be connected to the inflation chamber through fill tubes, diffusers, etc. The inflator 50 inflates the airbag 48 with inflation medium, such as a gas, to move the airbag 48 from the uninflated position to the inflated position. The inflator 50 may be supported by the housing 46, or any suitable component. For example, the inflator 50 may be fixed to the housing 46 via a fastener or the like. The inflator 50 may be, for example, a pyrotechnic inflator 50 that uses a chemical reaction to drive inflation medium to the airbag 48. The inflator 50 may be of any suitable type, for example, a cold-gas inflator 50.

The vehicle 20 may include an actuator 52 that can move the airbag assembly 26 along the track 24, e.g., in response to a command from a computer 28. For example, the actuator 52 may move the housing 46 along the elongation of the track 24 along the longitudinal axis A1. The actuator 52 may include a motor, reduction gear, a worm gear, a rack and pinion, and/or electromechanical and/or hydraulic structure suitable from moving the airbag assembly 26 along the track 24. One end of actuator 52 may be fixed to the track 24 and/or inner panel of the door and a screw may be operatively engaged with housing 46. Rotation of the screw by a motor of the actuator 52 may move the airbag assembly 26 along the track 24. As another example, the actuator 52 may be a linear actuator 52 that actuates to change a length between ends of the actuator 52, e.g., a linear servo, etc. The actuator 52 be a screw type including a threaded shaft and hole, a hydraulic type including a piston and cylinder, a rack and pinion type, etc.

Figure 6:
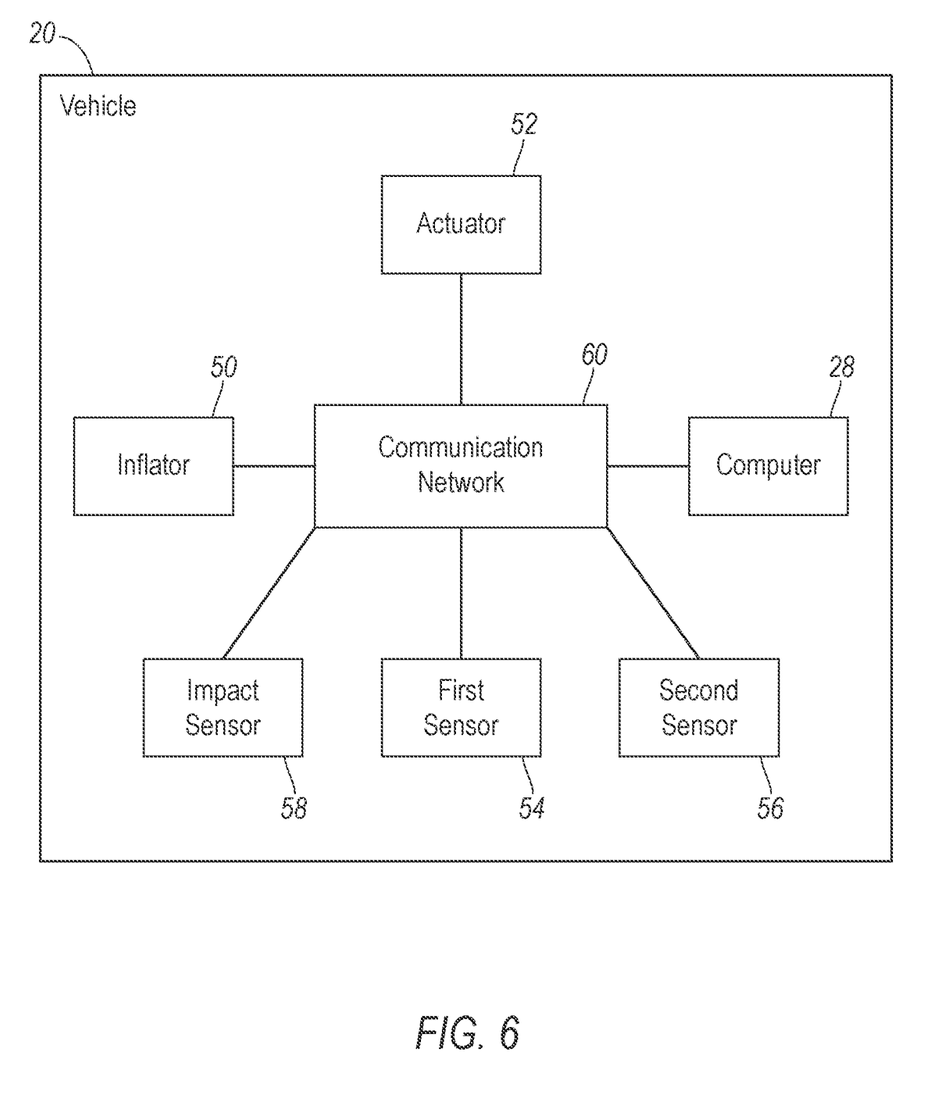
FIG. 6 is a block diagram of components of the vehicle.

With reference to FIG. 6, the vehicle 20 may include a first sensor 54 that can detect whether the seat 22 is in the forward-facing position or the rearward-facing position. The first sensor 54 may be, for example, a rotary position sensor supported by the floor and configured to detect a rotational position of the seat 22 relative to the floor. The first sensor 54 may be a hall effect sensor, a resolver sensor, an optical encoder, an inductive sensor, a potentiometer, or any suitable kind of sensor. The first sensor 54 may include one or more switches, e.g., a switch may be supported by the floor, the seat 22, etc. The switch may be open when the seat 22 is in the forward-facing position and closed when the rearward-facing position. The first sensor 54 may generate data, e.g., an output voltage, that indicates the rotational position of the seat 22. The first sensor 54 may be in communication with, and provide such data to, the computer 28.

The vehicle 20 may include a second sensor 56 that can detect a position of the seat 22 along the longitudinal axis A1. The second sensor 56 may be a capacitive displacement sensor, an eddy-current sensor, a hall effect sensor, an inductive sensor, a position encoder, a string potentiometer, an optical sensor, or any suitable kind of sensor. The second sensor 56 may generate data, e.g., an output voltage, that indicates the position of the seat 22 along the longitudinal axis A1. The second sensor 56 may be in communication with, and provide such data to, the computer 28.

The vehicle 20 may include at least one impact sensor 58 for sensing impact of the vehicle 20. The impact sensor 58 is configured to detect an impact to the vehicle 20. Alternatively or additionally to sensing impact, the impact sensor 58 may be configured to sense impact prior to impact, i.e., pre-impact sensing. The impact sensor 58 may be in communication with the computer 28. The impact sensor 58 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 58 may be located at numerous points in or on the vehicle 20.

The computer 28 includes a processor and a memory such as are known. The memory includes one or more forms of computer 28 readable media, and stores instructions executable by the vehicle 20 computer 28 for performing various operations, including as disclosed herein. Specifically, the memory stores instructions executable by the processor to execute the operations disclosed herein and electronically stores data and/or databases. For example, the computer 28 may include one or more dedicated electronic circuit including an ASIC (Application Specific Integrated Circuit) that is manufactured for a particular operation. In another example, the computer 28 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging. The computer 28 may be a set of computers communicating with one another.

The computer 28 is generally arranged for communications on a vehicle communication network 60 that can include a bus in the vehicle 20 such as a controller area network (CAN) or the like, and/or other wired and/or wireless mechanisms. Via the communication network 60, the computer 28 may transmit messages to various devices in the vehicle 20 and/or receive messages (e.g., CAN messages) from the various devices, e.g., the inflator 50, the actuator 52, the first sensor 54, the second sensor 56, the impact sensor 58, etc. Alternatively or additionally, in cases where the computer 28 actually comprises a plurality of devices, the vehicle 20 communication network 60 may be used for communications between devices represented as the computer 28 in this disclosure.

The computer 28 is programmed to, i.e., the memory may store instructions executable by the processor to, to identify whether the seat 22 is in the forward-facing position or in the rearward-facing position. The computer 28 may perform such identification based on data from the first sensor 54. For example, the computer 28 may identify the seat 22 is in the forward-facing position in response to receiving data from the first sensor 54 that indicates that the seat 22 is in the forward-facing position, e.g., data including a specified predetermined voltage, etc. Likewise, the computer 28 may identify the seat 22 is in the rearward-facing position in response to receiving data from the second sensor 56 that indicates that the seat 22 is in the rearward-facing position. The computer 28 may receive such data via the communication network 60.

The computer 28 may be programmed to move the airbag assembly 26 along the track 24. For example, the computer 28 may command the actuator 52 to rotate the screw a certain amount of rotations. The computer 28 may transit such command to the actuator 52 via the communication network 60. The command may specify that the actuator 52 move the housing 46 of the airbag assembly 26 along the track 24 to the first position or the second position, e.g., depending on whether the seat 22 is in the forward-facing position or in the rearward-facing position.

The computer 28 may be programmed to identify the position of the seat 22 along the longitudinal axis A1. The computer 28 may identify the position of the seat 22 along the longitudinal axis A1 based on data from the second sensor 56. For example, the computer 28 may identify the position of the seat 22 along the longitudinal axis A1, e.g., along the track 24, from data indicating the position of the seat 22 detected by the second sensor 56. The computer 28 may receive such data via the communication network 60.

The computer 28 may be programmed to select the first position and the second position for the airbag assembly 26 along the track 24 based on the position of the seat 22 along the longitudinal axis A1. For example, the computer 28 may store a look up table, formula, or the like associating various positions along the longitudinal axis A1 with various first and second positions. The computer 28 may select the first and second positions associated the position along the longitudinal axis A1 detected by the second sensor 56. The look up table, formula, or the like associating various positions along the longitudinal axis A1 with various first and second positions may be predetermined and stored in memory, e.g., by a manufacturer of the vehicle 20. As an alternate, e.g., when the seat 22 is not movable along the longitudinal axis A1, the single first position and the second position may be predetermined and stored in memory.

The first position and the second position may be positions for the housing 46 along the track 24. In other words, the airbag assembly 26 may be at the first position when the housing 46 is at the first position, and may be at the second position when the housing 46 is at second position. The first position and the second position enable specified positioning of the airbag assembly 26, e.g., of the housing 46, such that the airbag 48 in the inflated position is located to control kinematics of an occupant of the seat 22 in the forward-facing position or the rearward-facing position, respectively.

The first position(s) and second position(s) may be predetermined to account for the asymmetrically of the airbag 48 in the inflated position. For example, the first position and the second position may be predetermined such the airbag 48 in the inflated position is at a common position relative to the seat 22, e.g., to the seatback 36 along the longitudinal axis A1, when the airbag assembly 26 is at the first position and at the second position. In other words, the first position may be such that the airbag 48 in the inflated position is generally aligned with an occupant of the seat 22 in the forward-facing position, and the second position may be such that the airbag 48 in the inflated position is generally aligned with an a occupant of the seat 22 in the rearward-facing position.

The first position is different than the second position relative to the seat 22, e.g., such that the first position is a first distance from the seatback 36 along the longitudinal axis A1 and the second position is a second distance from the seatback 36 along the along the longitudinal where the first distance is different than the second distance. In other words, the housing 46 at the first position may be a different distance from the seatback 36 along the longitudinal axis A1 than the housing 46 at the second distance. The first distance may less than the second distance, e.g., such that the housing 46 at the first position is closer to the seatback 36 than the housing 46 in the second position. The first position may be at the seatback 36 along the longitudinal axis A1. For example, the seatback 36 and the housing 46 may generally be the same distance from the forward instrument panel 30 as each other. The second position may be spaced from the seatback 36 along the along the longitudinal axis A1. For example, the housing 46 at the second position may be rearward of the seatback 36 along the longitudinal axis A1.

Figure 7:
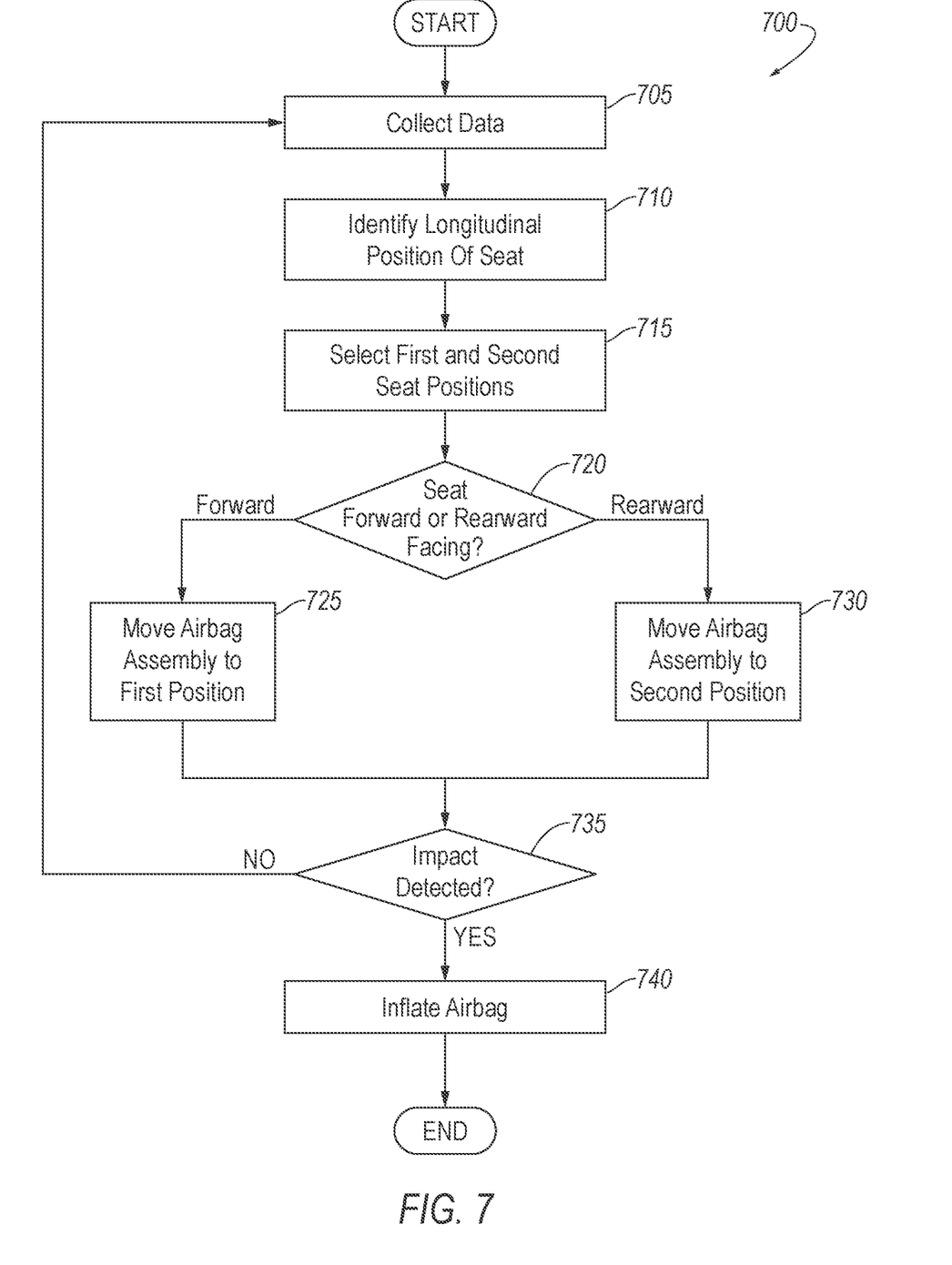
FIG. 7 is a flow chart of a process for controlling movement and inflation of the airbag assembly.

FIG. 7 is a process flow diagram illustrating an exemplary process 700 for controlling the vehicle 20 to position and inflate the airbag assembly 26. The process 700 may be performed by the computer 28. The process 700 begins in a block 705, in which the computer 28 collects data, e.g., received from the first sensor 54, the second sensor 56, the impact sensor 58, etc., e.g., via the communication network 60. The computer 28 may continue to receive data throughout the process 700. Throughout the process 700 in the present context means substantially continuously or at time intervals, e.g., every 100 milliseconds. The computer 28 may store such data.

Next at step 710, the computer 28 identifies a position of seat 22 along the longitudinal axis A1. The computer 28 may identify the position of the seat 22 based on data from the second sensor 56, e.g., as described herein.

At a step 715 the selects a first position and a second position based on the position of the seat 22 along the longitudinal axis A1 identified at the block 710, e.g., as described herein.

At a step 720 the computer 28 determines whether seat 22 is at the forward-facing position or the rearward-facing position, e.g., based on data from the first sensor 54. In response to determining the seat 22 is at the forward-facing position, the process moves to a block 725. In response to determining the seat 22 is at the rearward-facing position, the process moves to a block 730.

At the block 725 the computer 28 moves the airbag assembly 26 along the track 24 to the first position, e.g., by sending a command to the actuator 52, e.g., as described herein.

At the block 730 the computer 28 moves the airbag assembly 26 along the track 24 to the second position, e.g., by sending a command to the actuator 52.

At a block 735 the computer 28 determines whether an impact to the vehicle 20 has been detected, e.g., based on data from the impact sensor 58. In response to determining an impact has been detected, the process 700 moves to a block 740. In response to determining an impact has not been detected, the process 700 may return to the block 705. Alternately, the process 700 ends.

At the block 740 the computer 28 inflated the airbag 48 to the inflated position, e.g., by transmitting a command to inflator 50. The airbag 48 in the inflated position may control kinematic of an occupant of the seat 22. After the block 740 the process 700 ends.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Use of "in response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
    a seat movable to a forward-facing position and a rearward-facing position;
    a track elongated along a vehicle-longitudinal axis;
    an airbag assembly movable along the track; and
    a computer having a processor and a memory storing instructions executable by the processor to move the airbag assembly along the track to a first position in response to identifying the seat is in the forward-facing position and to a second position in response to identifying the seat is in the rearward-facing position, the first position different than the second position relative to the seat along the vehicle-longitudinal axis;
    the first position is a first distance from the seatback along the vehicle-longitudinal axis while the seat is in the forward-facing position, the second position is a second distance from the seatback along the vehicle-longitudinal axis while the seat is in the rearward-facing position, and the first distance less than the second distance.

2. The vehicle of claim 1, wherein the seat includes a seatback, the first position is at the seatback along the vehicle-longitudinal axis while the seat is in the forward-facing position, and the second position is spaced from the seatback along the vehicle-longitudinal axis while the seat is in the rearward-facing position.

3. The vehicle of claim 1, further comprising an actuator that moves the airbag assembly along the track in response to a command from the computer.

4. The vehicle of claim 1, wherein the airbag assembly includes a housing, an inflator, and an airbag inflatable to an inflated position.

5. The vehicle of claim 4, wherein the airbag in the inflated position extends more vehicle-forward than vehicle-rearward from the housing along the vehicle-longitudinal axis when the airbag assembly is in the first position and when the airbag assembly is in the second position.

6. The vehicle of claim 4, wherein the airbag in the inflated position is at a common position relative to the seat when the airbag assembly is at the first position and at the second position.

7. The vehicle of claim 4, wherein the first position and the second position are positions of the housing along the track.

8. The vehicle of claim 1, wherein the seat is movable along the vehicle-longitudinal axis.

9. The vehicle of claim 8, wherein the instructions include instructions to select the first position and the second position based on a position of the seat along the vehicle-longitudinal axis.

10. The vehicle of claim 1, further comprising a door, the track fixed to the door.

11. The vehicle of claim 1, further comprising a sensor that detects whether the seat is in the forward-facing position or the rearward-facing position, the sensor in communication with the computer.

12. The vehicle of claim 11, wherein the instructions include instructions to identify, based on data from the sensor, whether the seat is in the forward-facing position or the rearward-facing position.

13. The vehicle of claim 1, wherein the seat includes a seatback, the track at a top third of the seatback.

14. A computer, comprising a processor and a memory storing instructions executable by the processor to:
    identify whether a seat is in a forward-facing position or a rearward-facing position; and
    move an airbag assembly along a track elongated along a vehicle-longitudinal axis to a first position in response to identifying the seat is in the forward-facing position and to a second position in response to identifying the seat is in the rearward-facing position, the first position different than the second position relative to the seat along the vehicle-longitudinal axis;
    wherein the first position is a first distance from a seatback of the seat along the vehicle-longitudinal axis, the second position is a second distance from the seatback along the vehicle-longitudinal axis, the first distance less than the second distance.

15. The computer of claim 14, wherein the first position is at a seatback of the seat along the vehicle-longitudinal axis, the second position is spaced from the seatback along the vehicle-longitudinal axis.

16. The computer of claim 14, wherein the instructions include instructions to command an actuator to move the airbag assembly along the track.

17. The computer of claim 14, wherein the instructions include instructions to select the first position and the second position based on a position of the seat along the vehicle-longitudinal axis.

* * * * *